United States Patent Office 3,305,325
Patented Feb. 21, 1967

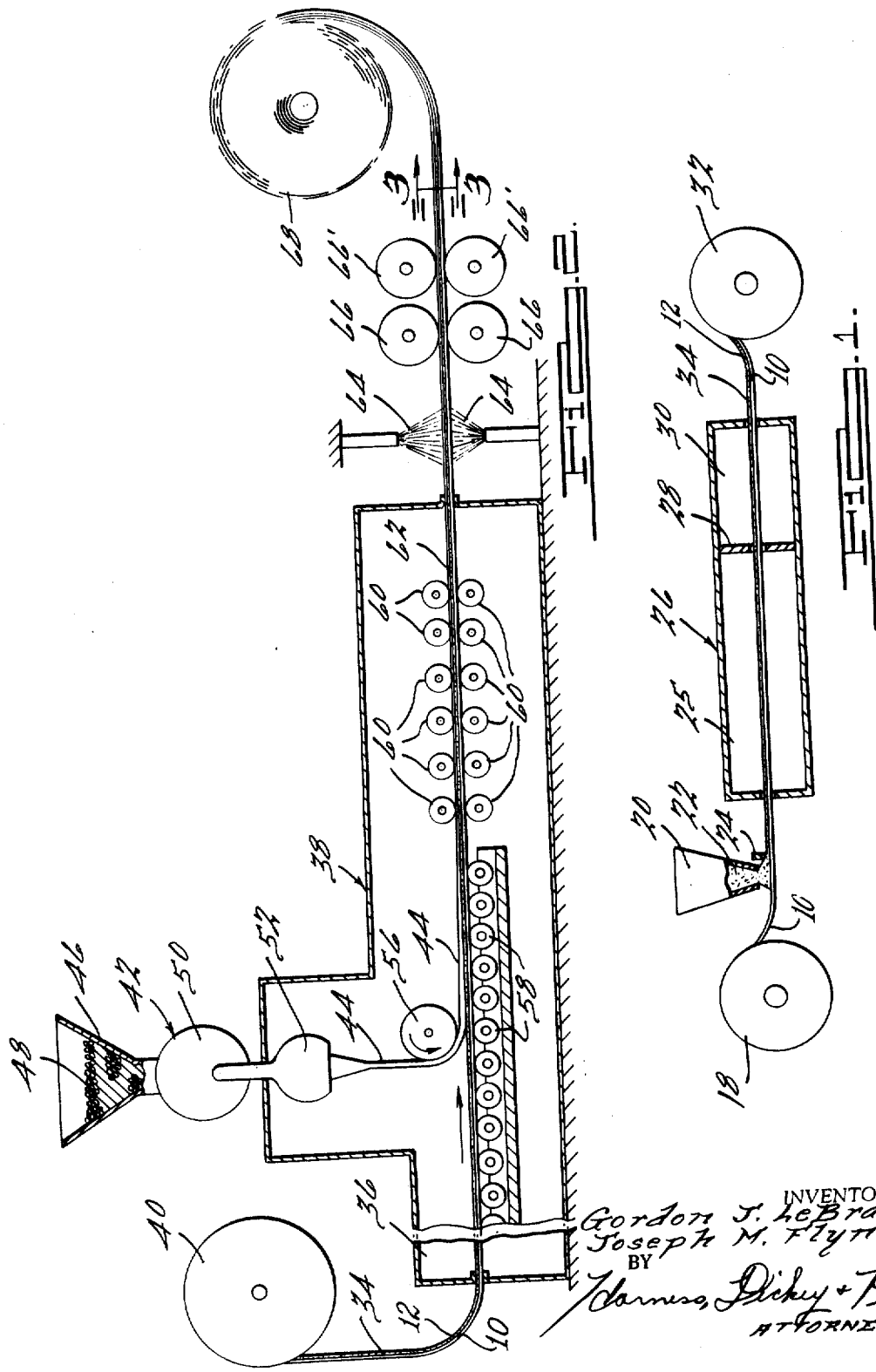

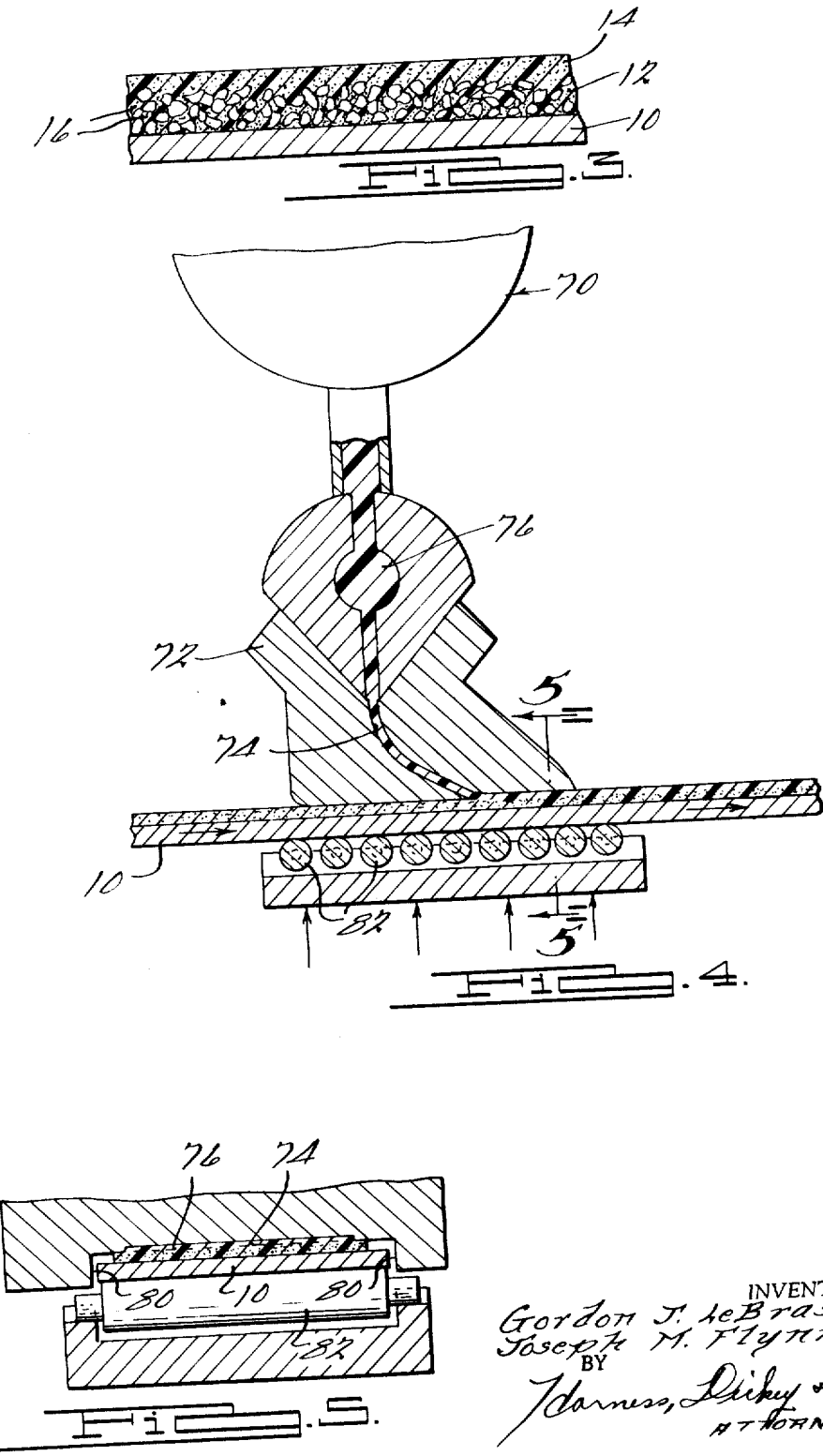

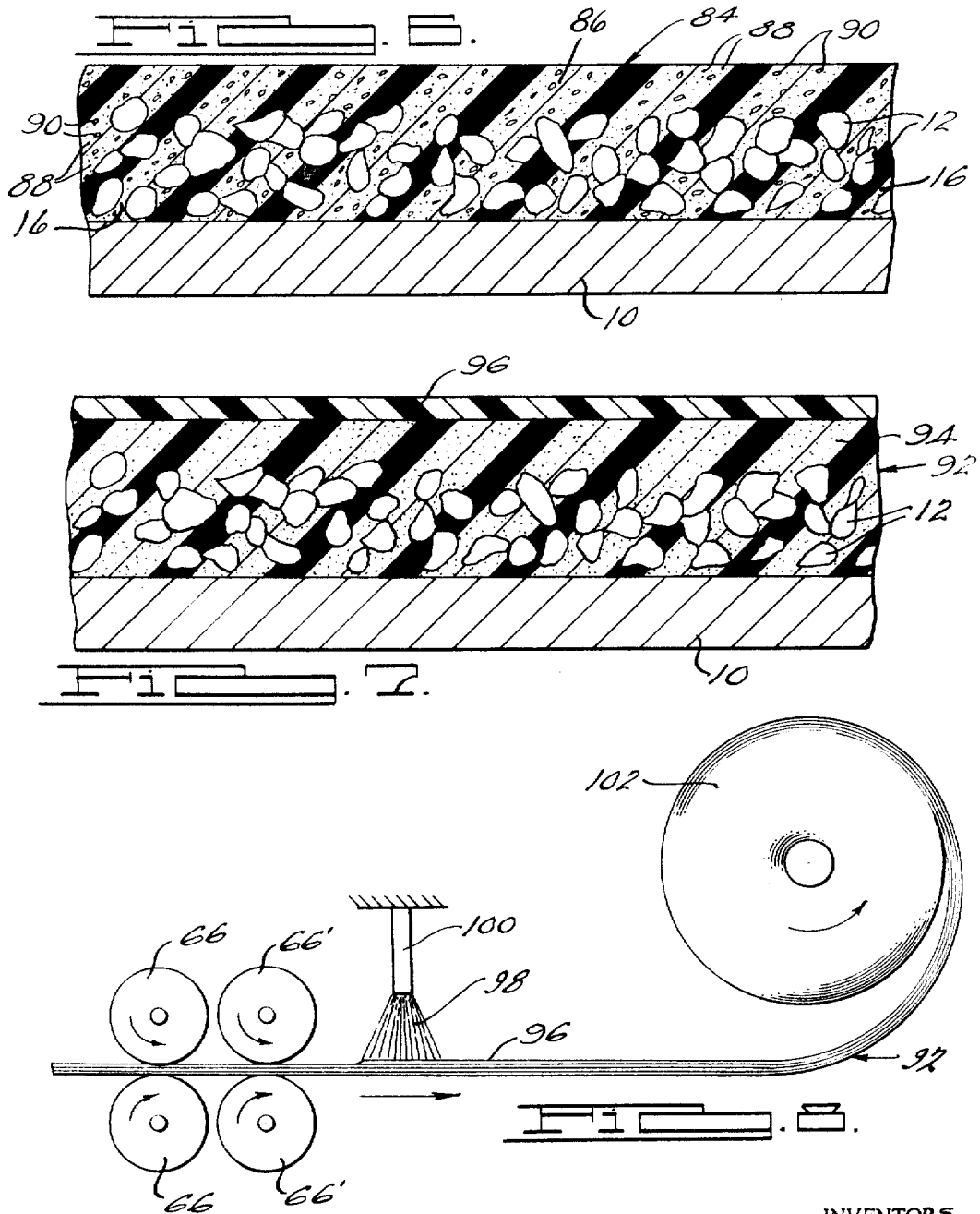

3,305,325
BEARING AND METHOD OF MAKING SAME
Gordon J. Le Brasse and Joseph M. Flynn, Ann Arbor, Mich., assignors to Federal-Mogul Corporation, a corporation of Michigan
Filed Oct. 21, 1964, Ser. No. 406,663
2 Claims. (Cl. 29—182.3)

The present application is a continuation-in-part of prior copending application Serial No. 339,296, filed January 21, 1964, for "Improved Bearing and Method of Making Same," now abandoned.

The present invention broadly relates to an improved bearing material and to a method of making the bearing material, and more particularly to a novel composite bearing material suitable for use under moderate loads at moderate temperatures in a substantially dry or non-lubricated condition. More specifically, the present invention is directed to an improved composite bearing material comprising a porous sintered matrix bonded to a hard metal backing strip wherein the pores of the matrix are impregnated with a nylon plastic containing finely particulated molybdenum disulfide which may additionally include fine particles of polytetrafluoroethylene. The present invention is further directed to a method of making bearing materials of the aforementioned type.

A variety of antifriction materials have heretofore been used or proposed for use as bearing materials operating under moderate load and temperature conditions in a substantially dry or nonlubricated condition. Of these antifriction materials, polytetrafluoroethylene has received the most widespread use for this purpose. While bearing materials incorporating polytetrafluoroethylene have provided satisfactory service in many bearing applications, this material is of relatively high cost and is further characterized as being difficult to fabricate into bearings of the desired configuration and size. Alternative plastic materials have also been proposed for use as antifriction materials for use under moderate load and temperature conditions but have been found inadequate in many applications for one or more reasons.

It is, accordingly, a principal object of the present invention to provide an improved composite bearing material which possesses excellent wear resistance and antifrictional characteristics under moderate load and temperature conditions in the presence of limited lubrication.

Another object of the present invention is to provide an improved composite bearing material incorporating self-lubricating characteristics which in the absence of substantial quantities of lubricants has been found to possess a long useful operating life while concurrently minimizing wear of the shaft or parts movably supported thereby.

Still another object of the present invention is to provide an improved composite bearing material which is of more economical manufacture, which can be simply fabricated into a variety of different sizes and configurations, and which is of durable operation.

A further object of the present invention is to provide a process for making an improved composite bearing material which is of flexible and simple control, of versatile and economical operation, and which forms the composite bearing material in a continuous strip form which thereafter can readily be fabricated into composite bearings of the requisite size and configuration.

The foregoing and other objects and advantages of the present invention are achieved by forming a composite bearing material comprising a hard metal bocking member to which a porous sintered metallic matrix is tenaciously bonded having a controlled porosity ranging from about 10% to about 50% by volume. The pores of the matrix are impregnated with at least partially filled with a polyamide plastic containing a controlled quantity of finely particulated molybdenum disulfide particles therein and which plastic is preferably applied in a manner so as to provide a thin surface coating of a thickness ranging from about 0.0005 to about 0.005 inch on the outer surface of the sintered porous matrix. The composite bearing material is formed in accordance with the process comprising the present invention by first sintering a finely particulated powder on the surface of a hard metal backing strip producing a porous sponge or matrix which subsequently is impregnated with the molybdenum disulfide containing polyamide plastic while in a molten or heat-softened condition effecting substantially complete filling of the pores thereof and thereafter further compacting the plastic and composite porous strip in a manner to effect further impregnation and a sizing of the impregnated strip leaving a residual surface layer of plastic of a controlled thickness. It is also contemplated within the scope of the present invention that the polyamide plastic may contain in addition to the molybdenum disulfide particles, a controlled proportion of finely particulated polytetrafluoroethylene particles of a controlled size to further enhance the antifrictional characteristics of resultant bearings formed from the composite bearing material eliminating any tendency of "stick-slip" during the break-in period of the bearing when operating in dry nonlubricated conditions. Alternatively, it is contemplated that the composite bearing material comprising the polyamide plastic including the molybdenum disulfide particles can be provided with a coating of polytetrafluoroethylene over substantially the entire surface thereof and of a controlled thickness to improve its antifrictional characteristics during the break-in period.

Other objects, features and advantages of the present invention will become apparent from the subsequent description and the appended claims, taken in conjunction with the accompanying drawings, in which:

FIGURE 1 is a diagrammatic side elevational view partly in section illustrating an apparatus for applying and sintering a finely particulated metallic powder on the surface of a continuous hard metal backing strip in accordance with one practice of the present invention;

FIG. 2 is a fragmentary side elevational view partly in section of the apparatus for applying a heat-softened polyamide resin containing molybdenum disulfide particles to the surface of the porous matrix effecting substantially complete impregnation thereof;

FIG. 3 is a fragmentary magnified transverse sectional view of the composite impregnated strip produced by the apparatus shown in FIG. 2 and taken along the lines 3—3 thereof;

FIG. 4 is a fragmentary side elevational view partly in section of an alternative satisfactory apparatus for applying the polyamide plastic to the surface of the porous matrix;

FIG. 5 is a fragmentary enlarged transverse sectional view of the apparatus shown in FIG. 4 and taken along the line 5—5 thereof;

FIG. 6 is a fragmentary magnified transverse sectional view of a composite impregnated bearing material comprising a continuous phase of polyamide plastic containing a discontinuous phase of molybdenum disulfide particles and polytetrafluoroethylene particles which is disposed on and substantially completely impregnated in a porous sintered composite bearing material;

FIG. 7 is a fragmentary magnified transverse sectional view through a composite impregnated bearing strip similar to that shown in FIG. 3 wherein the bearing surface of the strip is provided with a substantially continuous film or coating of a controlled thicknes of polytetrafluoroethylene, and FIG. 8 is a fragmentary side elevational view of the output end of the apparatus as illustrated in FIG. 2 which has been modified to include a nozzle for applying a substantially uniform and continuous film of a polytetrafluoroethylene plastic on the upper face surface of the composite bearing strip.

The improved composite bearing material comprising the present invention, as may be best seen in FIG. 3, comprises a hard metal backing strip indicated at 10 to which a porous sintered matrix 12 is tenaciously bonded and which in turn is substantially completely impregnated with a polyamide plastic indicated at 14. The hard metal backing strip 10 conventionally comprises a low carbon or low alloy steel which is of sufficient ductility and strength to enable subsequent deformation and machining of the composite bearing material into bearings or bushings of the desired configuration and sizes. Medium and high allow steels can also be satisfactorily employed for this purpose consistent with the requirements as dictated by the intended end use of the bearing. In either event, the backing strip 10 is of a metal of sufficient strength and is of a thickness so as to provide for adequate support of the overlying sintered matrix tenaciously bonded to one face thereof.

The porous sintered matrix may comprise any one of a variety of finely particulated metallic powders which upon heating to an elevated temperature weld together at their points of contact, forming a high strength porous matrix characterized as having a plurality of intercommunicating pores or voids indicated at 16 in FIG. 3 which are at least partially impregnated with the plastic 14 forming a composite construction. Improvements in the bond shear strength between the sintered matrix 12 and the metal backing strip 10 can be achieved by applying, if desired, a metal plating on the face surface of the backing strip to which the matrix is to be bonded, enhancing the tenacity of the bond formed during the sintering operation. Metallic platings such as copper, silver, nickel, aluminum, cobalt, etc., have been found satisfactory for this purpose. The necessity of employing such a face plating, which conventionally is applied in a thickness ranging from several $10/1000$ of an inch up to several thousandths of an inch in addition to the type of metal plating employed, will vary in accordance with the composition of the metal powder comprising the porous sintered matrix, as well as the severity of deformation to which the composite strip is to be subjected during the fabrication and the intended end use of the bearing produced. The use of such a barrier layer or metallic plating in accordance with the practice of the present invention is generally not required since bearings can be satisfactorily produced of the requisite strength and bond by directly applying and sintering the metallic powder on a clean face surface of the steel backing strip 10.

The particular composition of the powder employed for forming the sintered porous matrix is not critical. Powders consisting of copper base alloys, particularly bronze, which may include varying amounts of lead and other metals to provide the requisite strength and bearing characteristics are particularly suitable for forming a sintered porous matrix. Powder compositions of this type which provide the requisite strength and economy of the resultant bearing include, for example: 4% tin, 8% lead and the balance copper; 90% copper and 10% tin; 80% copper, 10% tin and 10% lead; 75% copper, 5% tin and 20% lead. The copper powder employed in the powder blend for forming the sintered porous matrix is preferably of a spherically shaped configuration so as to provide the necessary porosity of the resultant matrix for infiltration and impregnation with the plastic. While any one of a variety of copper powders can be satisfactorily employed in accordance with the practice of the present invention, spherical shaped copper powder derived from atomization of molten metal has been found particularly satisfactory, providing a strong uniformly porous matrix having a porosity ranging from about 10% up to about 50%. The particle size of the copper powder may broadly range from about 80 mesh to a size less than about 325 mesh and preferably of a size range of from about 80 mesh to about 200 mesh. The copper powder particles are also preferably distributed over the aforementioned size range as opposed to all of the particles being of a uniform size.

In addition to the copper powder, the powder blend also contains suitable proportions of lead and/or tin powders which can be incorporated in amounts conventionally corresponding to the percentages hereinabove set forth. The lead and tin powders preferably are of a particle size of less than about 100 mesh and may be conveniently admixed with the copper powder forming a homogenous blend. Alternatively, when both lead and tin powder are employed, all or a portion of the tin powder can be pre-alloyed with all or a portion of the lead powder forming pre-alloyed powder particles. In either event, the appropriate proportions of the powder constituents are mixed such as, for example, in a double cone-type blender until a substantially uniform powder blend is obtained which is thereafter applied to the surface of the backing strip in a substantially uniform layer and sintered thereon in a manner and under conditions so as to provide a net porosity of the matrix broadly ranging from about 10% to about 50% by volume. The specific temperature employed during the sintering operation will vary in accordance with the composition of the powder blend employed. The thickness of the sintered layer can be varied consistent with the intended end use of the resultant composite bearing material. Conventionally, thicknesses ranging from about 0.005 to about 0.030 inch are suitable for most purposes while thicknesses ranging from about 0.010 to about 0.015 inch are preferred and provide a bearing of excellent performance and of reasonable cost.

The plastic constituent indicated at 14 in FIG. 3 of the composite bearing material comprises a polyamide plastic of high melting point, conventionally referred to as nylon, made either by the condensation of dibasic acids and diamines or by the polymerization of lactams. Typical condensation polymers are polyhexamethyleneadipamide produced from the condensation of hexamethylenediamine and adipic acid and polyhexamethylene sebacamide produced from the condensation of hexamethylenediamine and sebacic acid. A typical lactam polymer is polymerized epsilon aminocaproic acid. Of the foregoing, polyhexamethyleneadipamide or nylon 6,6 constitutes the preferred material. Polyhexamethylene sebacamide is generally referred to as nylon 6,10 while the polymerization product of epsilon-caprolactam is generally referred to as nylon 6. The melting points of the aforementioned nylon plastics will vary depending on their average molecular weight. Conventionally, nylon 6,6 and nylon 6,10 are polymerized to a relatively high molecular weight in the order of about 15,000 resulting in a melting point of about 510° F. and 420° F., respectively. Nylon plastics of this order of molecular weight and melting point are preferred in accordance with the practice of the present invention.

The nylon plastic employed for impregnating the porous sintered matrix incorporates finely particulated molybdenum disulfide particles in proportions ranging from as low as 0.25% by weight to amounts as high as about 90% by weight. While percentages of the molybdenum disulfide in excess of about 5% by weight can be employed the resultant nylon plastic is characterized as becoming somewhat brittle and of reduced physical strength characteristics making amounts substantially in excess of about 5% unsatisfactory for some bearing applications. A further disadvantage of employing proportions of molybdenum disulfide in excess of about 5% is the difficulty of achieving substantially uniform dispersal of the molybdenum disulfide particles in the nylon plastic due to the tendency of the molybdenum disulfide particles to segregate and stratify when the plastic is molten or heat-softened during its impregnation into the porous matrix. For this purpose it has been found that concentrations of molybdenum disulfide ranging from about 0.25% up to about 4%, and preferably from about 1.5% to about 2.5% are suitable for use with nylon 6,6 and nylon 6, whereas concentrations of from about 0.25% to about 2% are preferred with nylon 6,10 while a variety of particle sizes of molybdenum disulfide can be satisfactorily employed, sizes less than about 40 microns are preferred.

The finely particulated molybdenum disulfide powder may be incorporated in the nylon plastic by tumbling flake or garnular nylon with the molybdenum disulfide powder. Alternatively, the molybdenum disulfide powder can be added in the form of a dispersion which is mechanically mixed with finely particulated nylon after which the resultant mixture is dried to remove the solvent therefrom. After a uniform mixture of the particulated nylon and molybdenum disulfide powders is achieved, the resultant powdered mixture can be melted and extruded into a film either directly on the surface of the porous matrix or alternatively can be preformed into a film which subsequently is applied on the surface of the porous matrix and heated to a softening point and in combination with pressure is impregnated into the interstices thereof. In lieu of forming a film, the molten plastic can be directly cast under pressure in the form of a film on the heated surface of the porous matrix thereby effecting partial to complete impregnation of the matrix and thereafter rolled to facilitate additional impregnation as required. When plastics are employed incorporating molybdenum disulfide particles in excess of about 5%, it is preferred to agitate the molten nylon plastic so as to maintain the molybdenum disulfide particles in a substantially homogeneous dispersion assuring that the plastic applied to the surface of the porous strip is of substantially uniform composition.

It is also contemplated within the scope of the present invention that the polyamide plastic may incorporate, in addition to the molybdenum disulfide particles, a controlled proportion of finely particulated polytetrafluoroethylene particles which have been found to eliminate any tendency of the bearing material to "stick-slip" during the bearing break-in period under operating conditions in which the bearing is used in a dry condition. Ordinarily, a thin film of oil present on the mating parts is sufficient to prevent the occurrence of a "stick-slip" condition during the initial wear-in period and bearings comprised of the composite bearing material incorporating the polyamide plastic having molybdenum disulfide particles provide for satisfactory operation. In certain instances, however, where the mating surfaces are in an absolutely dry condition, there is a tendency, particularly when the bearing to shaft clearance is exceedingly small to experience a tendency of "stick-slip," either at the initiation of the break-in period or at some point during the early phase of operation which detracts from obtaining optimum bearing characteristics. While the reason for the "stick-slip" condition is not completely understood at the present time, it is believed that during the course of fabricating the bearing from the composite bearing material, small surface irregularities are created which, when the bearing is used at extremely close dimensional clearance fits, occasions a "stick-slip" condition when the bearing is used in an absolutely dry and nonlubricated condition. In either event, it has been found that by incorporating controlled proportions of finely particulated polytetrafluoroethylene particles in the polyamide plastic in combination with the molybdenum disulfide particles, or by applying a substantially continuous film of polytetrafluoroethylene over substantially all of the bearing surface, the tendency of "stick-slip" even in absolutely dry nonlubricated conditions is eliminated.

In accordance with one of the alternatives, as hereinabove set forth, the nylon plastic incorporating the molybdenum disulfide particles as hereinbefore set forth, is further modified to include from about 5% up to about 25% by weight of finely particulated polytetrafluoroethylene particles. The inclusion of the polytetrafluoroethylene particles in amounts less than about 5% does not provide any appreciable benefit over the "stick-slip" characteristics obtainable with the molybdenum disulfide impregnated nylon plastic alone whereas amounts in excess of about 25% by weight do not provide any substantial improvement over that obtained by the inclusion of lesser amounts within the aforementioned range and, accordingly, constitutes a costly practice. It is for this reason that the amounts of polytetrafluoroethylene that can be satisfactorily employed, can range from about 5% up to about 25% by weight, and preferably from about 10% up to about 20% by weight of the filled polyamide plastic impregnant.

In order to achieve the benefits of the present invention, it has been found necessary to control the particle size of the polytetrafluoroethylene constituent within a range of less than about 2 microns up to about 43 microns or 325 mesh. Preferably, the average particle size of the polytetrafluoroethylene is controlled within about 6 to about 12 microns. It has been found that when the particle size of the polytetrafluoroethylene is greater than about 325 mesh, it is more difficult to impregnate the sintered metallic strip and, moreover, particles of such a magnitude have a tendency to agglomerate and thereby reduce the resultant physical properties of the composite structure. It is for this reason that the particles of the polytetrafluoroethylene are controlled in size to less than 325 mesh and preferably in a range of from about 6 to about 12 microns wherein a substantially uniform distribution of the particles can be achieved throughout the nylon plastic in addition to facilitating substantially complete impregnation of the sintered porous matrix by any of the techniques as herein set forth.

A composite bearing material incorporating both the molybdenum disulfide and polytetrafluoroethylene particles is illustrated in FIG. 6 and is indicated at 84. As will be noted, the composite bearing material 84 comprises the hard metal backing strip 10 having the porous sintered matrix 12 tenaciously bonded thereto which is formed with a plurality of pores or voids 16, which are substantially completely impregnated with the nylon plastic indicated at 86 including fine sized particles of molybdenum disulfide 88, and fine sized particles of polytetrafluoroethylene 90 distributed substantially throughout the nylon plastic. The plastic phase of the composite bearing material is characterized as comprising a continuous phase of the nylon plastic 86 incorporating therein a discontinuous phase comprisng the molybdenum disulfide particles 88 and the polytetrafluoroethylene particles 90 in the form of discreet particles which are substantially uniformly distributed throughout.

In accordance with an alternative embodiment for eliminaitng any "stick-slip" tendency of the composite bearing material, a thin film of polytetrafluoroethylene is applied substantially uniformly and over substantially the entire bearing surface of the composite bearing material. A modified composite bearing material in accordance with this latter embodiment is illustrated in FIG. 7. The composite bearing material indcated at 92 consists of a hard metal backing strip 10 and a sintered porous matrix 12 tenaciously bonded to one surface thereof which is impregnated with a molybdenum disulfide containing nylon plastic indicated at 94. A thin substantially uniform film 96 of polytetrafluoroethylene is applied and is securely adhered to the upper bearing surface of the bearing material. For the purposes of the present invention, it has been found that the polytetrafluoroethylene film or coating 96 can range from about 0.0002 to about 0.001 inch and preferably from about 0.0003 to about 0.0006 inch. Film thicknesses in excess of about 0.001 inch have been found not to provide any appreciable benefit over that obtained with films of lesser thickness and, accordingly, the use of films in excess of about 0.001 inch constitutes a costly practice in addition to creating problems in providing satisfactory clearance between the shaft and the bearing surface. On the other hand, films of a thickness of less than about 0.0002 inch in thickness have been found in some instances to provide inadequate lubricity to prevent "stick-slip" under extremely severe initial operating conditions in an absolutely dry and nonlubricated condition such that amounts above 0.0002 up to about 0.001, and preferably from about .0003 to about .0006 are most advantageously employed.

The application of the film of polytetrafluoroethylene to the bearing surface of the composite bearing material can most readily be achieved by applying a solvent dispersion of fine sized polytetrafluoroethylene particles in a thermoplastic resin directly to the surface of the resultant bearing material or to the surface of the resultant bearing formed therefrom. The dispersion of the polytetrafluoroethylene particles is comprised of particles within a size range of generally less than 5 microns. Any one of a variety of solvent dispersions of the types well known in the art, can be satisfactorily employed for applying an adherent coating or film of the polytetrafluoroethylene particles on the bearing surface of the resultant composite strip. Typical solvent resin systems suitable for this purpose include those such as disclosed in United States Patent 3,055,852 granted September 25, 1962. In the aforementioned patent, dispersions of polytetrafluoroethylene particles of a size of from 0.1 to 3 microns are formed employing a cellulose ether resin in a volatile organic solvent. The dispersions thus formed are stable and can be readily applied to the bearing surface such as by spraying, brushing, dipping or the like forming an adherent film comprising the cellulose ether resin in which the polytetrafluoroethylene particles are imbedded and tenaciously bonded.

In accordance with the alternative embodiments as hereinbefore described, elimination of "stick-slip" is achieved by either including polytetrafluoroethylene particles within the nylon plastic matrix or, alternatively, depositing a film or coating of such particles on the exterior bearing surface of the resultant composite strip. While the provision of such a film on the bearing surface completely eliminates any tendency of "stick-slip," it is contemplated within the scope of the present invention that such a coating can be applied to the nylon plastic substrate incorporating molybdenum disulfide particles alone as well as one which may additionally include particles of polytetrafluoroethylene although this latter practice is costly and does not provide any appreciable improvement over that obtained by employing the coating directly on the conventional molybdenum disulfide filled nylon plastic.

The impregnation of the porous matrix having a pore volume ranging from about 10% to about 50% is achieved in a manner subsequently to be described so as to effect substantially complete filling thereof and the provison of a substantially continuous residuary film of plastic on the surface of the matrix. While some air may be occluded within the porous matrix, it has been found that satisfactory bearings have been obtained by effecting at least a 75% filling of the pores of the matrix and preferably at least about a 90% filling of the pores of the matrix. The impregnation is preferably carried out in a manner so that the plastic extends into the matrix to a point contiguous to the interface between the steel backing strip, and the porous matrix bonded thereto.

In addition to the molybdenum disulfide and polytetrafluoroethylene constituents in the nylon plastic, it is also contemplated within the scope of the present invention that the nylon plastic can be modified by the inclusion of small quantities of other filler constituents and modifying agents provided that the resultant plastic consists essentially of nylon and provided further that the other fillers and modifying constituents do not appreciably reduce the physical strength properties, abrasion resistance, and coefficient of friction of the molybdenum disulfide filled plastic. Such additional constituents may comprise, for example, fillers such as graphite and other modifying agents such as antioxidants or the like, which can be employed in amounts generally up to about 2% by weight.

The improved bearing material illustrated in FIGURE 3 comprising the present invention will now be further described in connection with the apparatus for forming the bearing material as set forth in FIGURES 1, 2, 4 and 5. As shown in FIGURE 1, the hard metal backing strip 10 is unwound from a feed roll 18 and is extended horizontally therefrom beneath a hopper 20 containing metallic powder particles 22 for forming the sintered porous matrix. The powder 22 is distributed into a substantially uniform layer across substantially the entire width of the backing strip 10 by means of a doctor blade 24 and the strip is advanced into a sintering chamber 25 of a furnace 26 in which the powder layer is heated to the appropriate sintering temperature while exposed to a reducing atmosphere such as, for example, a cracked gas atmosphere. The temperature and the time that the powder layer is maintained within the sintering chamber 25 is controlled consistent with the specific composition of the metallic powder employed for forming the porous matrix so as to provide a tenaciously bonded matrix having a porosity ranging from about 10% up to about 50%.

The furnace 26 is preferably provided with a partition 28 through which the hot sintered strip passes from the sintering chamber into a cooling chamber indicated at 30 in FIGURE 1 after which the strip may be conveniently wound on a suitable takeup reel 32. Alternatively, the backing strip incorporating the sintered porous matrix thereon can be advanced directly from the cooling chamber into the inlet side of the apparatus as shown in FIGURE 2 which the nylon plastic is applied to and impregnated into the sintered porous matrix. The cooling chamber 30 of the apparatus shown in FIGURE 1 similarly is provided with a reducing atmosphere to prevent oxidation of the porous matrix during the cooling phase of the process cycle. When the composite strip indicated at 34 comprising the steel backing strip 10 and the porous sintered matrix 12 thereon is to be coiled and stored prior to the impregnation operation, the composite strip 34 is cooled to a temperature sufficiently low, such that no excessive oxidation of the porus matrix occurs upon the exiting of the strip from the cooling chamber.

If, on the other hand, the composite strip 34 is to be advanced directly to the plastic impregnating phase of the process, the cooling chamber is controlled so as to reduce the temperature of the composite strip to within a range slightly above the melting point of the nylon plastic to be subsequently applied to the surface of the porous matrix.

In a two-step process such as typified by FIGURES 1 and 2, the coiled composite strip 34 is first preheated in a preheat section 36 of a furnace 38 as it is continuously unwound from the feed roll 40 as illustrated in FIGURE 2. The composite strip 34 after attaining the appropriate temperature on passing through the preheat section 36 is advanced beneath an extrusion assembly 42 whereupon an extruded film of plastic indicated at 44 is applied to the upper surface of the porous matrix thereof. The extrusion assembly 42 comprises a hopper 46 containing a particulated or pelletized nylon plastic 48 incorporating molybdenum disulfide particles therein which move downwardly into a heating section 50 and are molten and subsequently extruded through a film extrusion die 52 forming a curtain of molten plastic. The molten plastic is heated to a temperature above its melting point below that at which rapid thermal degradation thereof occurs and at which the film is of insufficient fluidity to run off the surface of the composite strip. More accurately, the plastic can be said to be heated to a temperature at which heat softening thereof occurs enabling extrusion of the plastic into a film.

The molten plastic film 44 is tensioned and pulled downwardly and beneath a draw-down roll 56 disposed in spaced relationship above the composite strip 34 which is supported underneath by a series of supporting rollers 58. The composite strip 34 having the molten plastic film 44 on the surface thereof is thereafter advanced horizontally between a series of longitudinally spaced impregnating rolls 60 which apply pressure to the film effecting penetration thereof into the pores of the porous matrix. The impregnating rolls 60 are preferably maintained at a temperature below about 300° F. to prevent adherence of the plastic thereto. The gap between the impregnating rolls 60 may progressively decrease on moving toward the right as viewed in FIGURE 2 effecting progressively greater impregnation of the porous matrix with the nylon plastic.

On passing from the exit end of the last of the impregnating rolls 60, the resultant composite bearing material indicated at 62 passes out of the exit end of the furnace 38 and is rapidly cooled to a temperature below the melting point of the plastic such as by means of a pair of water spray jets 64. After a cooling of the composite bearing material 62, the strip is advanced between two sets of sizing rolls 66, 66' which further compress the strip providing a smooth uniform surface finish to the layer of plastic on the surface of the porous matrix and to properly gauge the thickness of the composite bearing material. The resultant composite bearing material may thereafter be conveniently coiled on a takeup reel 68 in which form the composite bearing material can be transferred to subsequent fabricating operations for forming bearings of the desired shape and size.

In lieu of applying the nylon plastic in the form of a molten plastic film 44 as illustrated in FIGURE 2, suitable impregnation of the porous matrix can be achieved in accordance with the apparatus as illustrated in FIGURES 4 and 5. As shown in FIGURE 4, an extrusion assembly 70 is provided for melting the plastic material which passes downwardly into an extrusion coating die 72 disposed in contact with the surface of the composite strip 34 advanced therebelow. The extrusion coating die 72 is formed with a cavity 74 for receiving the molten plastic 76 which is inclined in the direction of travel of the composite strip or toward the right as viewed in FIGURE 4. The outer edge of the down stream end of the cavity 74 is spaced from the surface of the porous matrix 12 a sufficient distance to deposit a plastic film 78 on the surface of the matrix in response to the advancing movement of the composite strip.

The cavity 74 as illustrated in FIGURE 5 extends transversely of the composite strip to a point slightly inside of the edges of the porous sintered layer 12. The extrusion coating die 72 is also formed with a pair of diametrically opposed longitudinally extending guide edges 80 for slidably contacting the side edges of the metal backing strip 10 maintaining it in appropriate alignment relative to the coating die 72. A suitable support such as rolls 82 are provided which are adapted to movably support the underside of the center portion of the backing strip 10 as it is advanced beneath the extrusion assembly 70.

In a coating die set-up of the approximate aforementioned design, partial to complete impregnation of the porous matrix is effected within the die cavity by the fluid pressure of the molten plastic. This pressure may range from 200 to 10,000 p.s.i. depending on design of die clearances and operating conditions of the extruder.

The resultant composite strip incorporating the plastic film 78 thereon deposited in a manner as illustrated in FIGURES 4 and 5 may subsequently be advanced through a series of impregnating rolls such as the rolls 60 as illustrated in FIGURE 2 effecting substantially complete impregnation of the porous matrix followed thereafter by a rapid cooling and a sizing of the composite bearing material in a same manner as hereinbefore described. It is also contemplated within the scope of the present invention that in lieu of extruding a film 44 of plastic directly on the composite strip as shown in FIGURE 2 or casting a plastic film 78 in a manner as illustrated in FIGURES 4 and 5, impregnation of the porous matrix can also be satisfactorily achieved by employing a performed plastic film of the desired thickness which is applied in overlying relationship on a preheated composite strip and simultaneously heating the plastic film effecting a melting thereof enabling subsequent impregnation of the pores of the matrix by the impregnating rolls in a manner as previously described. In accordance with this latter procedure, a preformed plastic film of the desired width and thickness can be supplied in the form of a roll and continuously unwound therefrom in response to the advancing movement of the composite strip.

In accordance with the alternative embodiments of the composite bearing material, the composite bearing strip 84 as illustrated in FIGURE 6, can be formed in accordance with the processes illustrated in FIGURE 2 and FIGURE 4. The finely particulated polytetrafluoroethylene particles incorporated in the nylon plastic in combination with the molybdenum disulfide particles can be applied in the form of a molten plastic film in accordance with the technique illustrated in FIGURE 2, or by an extrusion assembly as illustrated in FIGURES 4 and 5. In each case, the polytetrafluoroethylene particles remain as discrete particles within a continuous phase of the molten nylon plastic and are present in that form in the resultant composite bearing material formed. Similarly, the composite bearing material 92, as illustrated in FIGURE 7, is preferably formed in accordance with the method as fragmentarily illustrated in FIGURE 8, wherein the composite bearing material, after passing through the sizing rolls 66, 66' is further subjected to a coating operation in which an overlying film of the polytetrafluoroethylene particles indicated at 96 is applied to the upper bearing surface of the bearing strip. In the exemplary embodiment, as illustrated in FIGURE 8, the polytetrafluoroethylene film 96 is applied in the form of a spray 98 from a nozzle 100 effecting a controlled and substantially uniform coverage of the upper surface of the bearing material. The spray comprises a solvent dispersion of fine sized polytetrafluoroethylene particles in a thermoplastic resin of the type as hereinbefore described, and the resultant coating thereafter air dries leaving a residuary coating of the polytetrafluoroethylene particles bonded to the bearing surface of the composite strip which can simply be coiled in a suitable takeup roll 102 in which it can be transferred to subsequent fabricating operations for forming bearings and bushings of the desired shape and size. It will be understood that in lieu of employing a spray for depositing the polytetrafluoroethylene film 96 on the bearing surface of the composite bearing material 92, alternative satisfactory techniques such as roller coating and knife-over-roll coaters can also be satisfactorily employed for this purpose. Conventionally, however, spray techniques have been found most satisfactory for depositing films in thicknesses of up to 0.001 inch providing substantially uniform coverage of the bearing surface. While the application of the polytetrafluoroethylene film 96 is preferably achieved on a continuous basis and directly on the surface of the composite bearing material, it is also contemplated that the deposition of the film can be achieved after the composite bearing material has been fabricated into bearings of the appropriate configuration or during intervening steps of the bearing fabricating process.

In either event, the resultant bearing material comprising the backing strip and the plastic impregnated porous matrix tenaciously bonded thereto is characterized as having exceptionally good bearing characteristics for use under light and moderate loading conditions at temperatures up to as high as 350° F.

In order to further illustrate the improved composite bearing material comprising the present invention, the following examples are provided. It will be appreciated that the examples as hereinafter set forth, are provided for illustrative purposes and are not intended to be limiting of the scope of the invention as set forth in the subjoined claims.

EXAMPLE I

A bearing material was made employing a sintered bronze matrix containing 88% copper, 4% tin and 8% lead which was applied in a thickness ranging from about 0.010 to about 0.015 inch and tenaciously bonded to a type 1010 steel backing strip. The composite strip thus formed was preheated in a reducing atmosphere to a temperature of between about 500° F. to about 600° F. and a nylon-6,6 plastic having a melting point of about 485° F. incorporating about 2.5% of molybdenum disulfide particles was applied to the surface of the porous matrix at a temperature of from about 500° F. to about 600° F. in a thickness of about 0.010 inch. The resultant strip was thereafter advanced through a series of impregnating rolls effecting substantially complete impregnation of the porous matrix with the nylon plastic. The impregnating rolls disposed in contact with the molten nylon plastic film were chilled to a temperature below about 300° F. On passing from the exit end of the impregnating rolls the composite impregnated bearing material was rapidly chilled by a water spray to a temperature below about 150° F. and thereafter was passed between two sets of sizing rolls effecting a smoothening out and a gaging of the bearing material and providing a residuary plastic film on the surface of the porous matrix of a thickness of between about 0.0005 to about 0.005 inch.

Test bushings were prepared from the bearing material made in accordance with the process as described above and were subjected to an oscillating bushing wear test comprising 500,000 cycles. A comparative test of a Teflon impregnated bearing was concurrently made under the same test conditions to evaluate the relative bearing characteristics of these two materials. At the completion of the test which was conducted at temperatures up to 300° F., it was found that both the bushings made in accordance with the present invention and those incorporating polytetrafluoroethylene had sustained approximately the same degree of wear; but that the wear of the shaft supported by the nylon plastic impregnated bushing was approximately one-half of that of the shaft supported by the corresponding polytetrafluoroethylene bushing. These test data confirm the excellent bearing characteristics of the improved composite bearing material comprising the present invention over plastic bearing materials heretofore known which are achieved at substantially lower cost and provide for greater versatility in fabrication.

EXAMPLE II

A composite bearing material was made in accordance with an alternative embodiment of the present invention employing a sintered bronze matrix corresponding to that as disclosed in Example I. Impregnation of the resultant sintered porous matrix was performed under the same conditions as set forth in Example I employing a nylon-6,6 plastic of the same type as disclosed in Example I, which included 2.5% of molybdenum disulfide particles in addition to 15% by weight of polytetrafluoroethylene particles of an average particle size ranging from about 6 to about 12 microns. The resultant composite bearing material produced corresponded to that as disclosed in Example I with the exception that it incorporated 15% by weight of polytetrafluoroethylene particles distributed substantially uniformly throughout the nylon plastic matrix.

A series of test bushings were fabricated from the resultant composite strip formed and were subjected to a rotary bushing wear test under various loads and operating speeds under perfectly dry nonlubricated conditions. These tests confirmed the excellent low friction characteristics of the bushings formed and the absence of any "stick-slip" or seizure of the plastic bearing lining during initial break-in period as well as during sustained testing thereafter. The bushings prepared possessed excellent load carrying characteristics and excellent wear resistance corresponding in performance to bushings prepared from composite strips in accordance with the description as set forth in Example I.

EXAMPLE III

The composite bearing material made in accordance with the description of Example I was subjected to a further treating step in which a film of polytetrafluoroethylene particles in the form of a solvent dispersion in a cellulose ether resin was applied to the upper plastic bearing surface of the strip. The resultant coating formed was of a thickness of 0.0005 inch and was uniform over substantially the entire bearing surface of the composite bearing material. Bushings prepared from this bearing material were subjected to rotary bushing tests under the same conditions as specified in Example II and similarly were found to possess excellent anti-frictional characteristics and excellent wear resistance when operated under perfectly dry and nonlubricated conditions. The results obtained on the test bushings were substantially equal to the results obtained on the bushings prepared from the composite strip formed in accordance with the description as provided in Example II.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. Composite bearing material comprising a hard metal backing strip, a porous sintered metallic matrix tenaciously bonded to one face of said backing strip, said porous matrix having a porosity of from about 10% to about 50% by volume, and a film of a nylon plastic selected from the group consisting of nylon-6,6, nylon-6,10, and nylon-6 disposed on the exposed surface of said porous matrix and extending inwardly into and mechanically interlocked within the pores thereof, said nylon plastic constituting a continuous phase including a discontinous phase of finely particulated molybdenum disulfied particles present in an amount of from 0.25% to 5% by weight and a discontinuous phase of finely particulated polytetrafluoroethylene particles of a size less than about 325 mesh and present in an amount of from about 5% to about 25% by weight, said molybdenum disulfied particles and said polytetrafluoroethylene particles distributed substantially uniformly through said continuous phase of said nylon plastic.

2. A composite bearing material comprising a hard metal backing strip, a porous sintered metallic matrix tenaciously bonded to one face of said backing strip, said porous matrix having a porosity of from about 10% to about 50% by volume, and a film of a nylon plastic selected from the group consisting of nylon-6,6, nylon-6,10 and nylon-6, disposed on the exposed surface of said porous matrix and extending inwardly into and mechanically interlocked within the pores thereof, said nylon plastic constituting a continuous phase including a discontinuous phase of a finely particulated molybdenum disulfide powder substantially uniformly distributed therethrough and present in an amount of from about 0.25% to about 5% by weight, and a film of polytetrafluoroethylene on the exposed face surface of said nylon plastic of a thickness of up to about 0.001 inch and extending substantially over the entire surface thereof.

(References on following page)

References Cited by the Examiner

UNITED STATES PATENTS

| | | | |
|---|---|---|---|
| 2,187,086 | 1/1940 | Koehring | 252—12.2 |
| 2,691,814 | 10/1954 | Tait | 29—182.5 |
| 2,788,324 | 4/1957 | Mitchell | 252—12.2 |

FOREIGN PATENTS

| | | |
|---|---|---|
| 657,085 | 9/1951 | Great Britain. |
| 676,300 | 7/1952 | Great Britain. |
| 701,690 | 12/1953 | Great Britain. |
| 707,066 | 4/1954 | Great Britain. |

CARL D. QUARFORTH, *Primary Examiner.*

L. DEWAYNE RUTLEDGE, *Examiner.*

R. L. GRUDZIECKI, *Assistant Examiner.*